(12) United States Patent
Liu (10) Patent No.: US 11,105,983 B2
(45) Date of Patent: Aug. 31, 2021

(54) RECEPTACLE STRUCTURE FOR OPTICAL CONNECTOR

(71) Applicant: Mei-Miao Liu, Miaoli County (TW)

(72) Inventor: Mei-Miao Liu, Miaoli County (TW)

(73) Assignee: ACSUPER TECHNOLOGIES INC., Myau-Li County (TW)

( * ) Notice: Subject to any disclaimer, the term of this patent is extended or adjusted under 35 U.S.C. 154(b) by 0 days.

(21) Appl. No.: 16/904,592

(22) Filed: Jun. 18, 2020

(65) Prior Publication Data

US 2021/0124129 A1    Apr. 29, 2021

(30) Foreign Application Priority Data

Oct. 25, 2019    (TW) ................................ 108138507

(51) Int. Cl.
*G02B 6/36* (2006.01)
*G02B 6/38* (2006.01)

(52) U.S. Cl.
CPC ........... *G02B 6/3825* (2013.01); *G02B 6/387* (2013.01); *G02B 6/3873* (2013.01); *G02B 6/3893* (2013.01)

(58) Field of Classification Search
CPC .... G02B 6/3825; G02B 6/387; G02B 6/3893; G02B 6/3873; G02B 6/36
See application file for complete search history.

(56) References Cited

U.S. PATENT DOCUMENTS 10,809,480 B1* 10/2020 Cox ..................... G02B 6/4452
2019/0285808 A1* 9/2019 Lee ...................... G02B 6/3825

* cited by examiner

*Primary Examiner* — Jennifer Doan (57) ABSTRACT

A receptacle structure for optical connector comprises a base, a first adjusting plate and a second adjusting plate. The base has a supporting frame formed on the top thereof and supporting structures respectively formed at the two side walls thereof. The first adjusting plate arranged on the supporting frame has a first matching structure and a second matching structure. The second adjusting plate arranged on the supporting structures has third matching structure and fourth matching structure. When the first matching structure is arranged at an insertion side and the third matching structure is arranged toward the inner space of the base, the first connector could be inserted into the base. When the second matching structure is arranged at the insertion side and the fourth matching structure is arranged toward the inner space of the base, the second connector could be inserted into the base.

14 Claims, 10 Drawing Sheets

FIG. 6C ated Taiwan Patent
RECEPTACLE STRUCTURE FOR OPTICAL CONNECTOR

CROSS-REFERENCE TO RELATED APPLICATION

This application claims the benefit of Taiwan Patent Application No. 108138507, filed on Oct. 25, 2019, in the Taiwan Intellectual Property Office of the R.O.C, the disclosure of which is incorporated herein in its entirety by reference.

FIELD OF INVENTION

The present invention relates to a receptacle structure for a connector. In particular, it relates to the receptacle structure for an optical connector.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100G optical module communication is not enough, and the future will be expected to move towards the era of 400G optical module communications.

In the field of 400G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

Figure 1A:
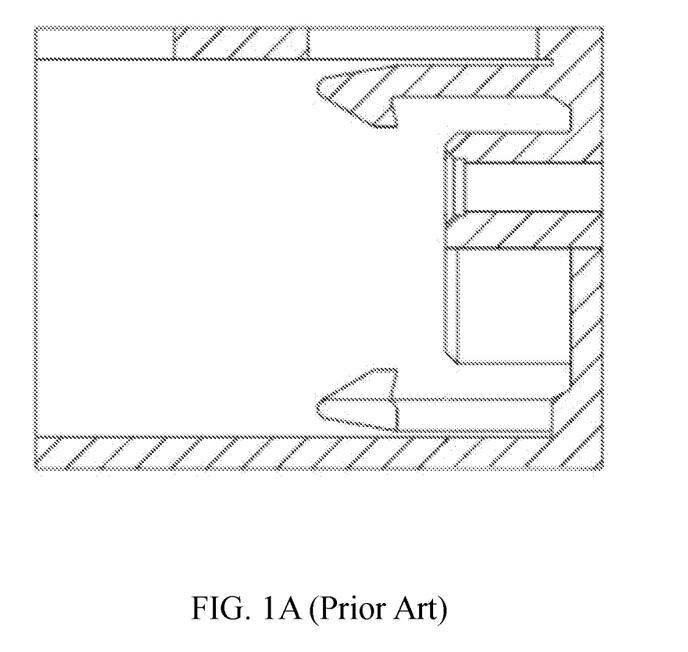
FIGS. 1A and 1B are schematic cross-sectional diagrams of two connectors with different specifications.
Figure 1B:
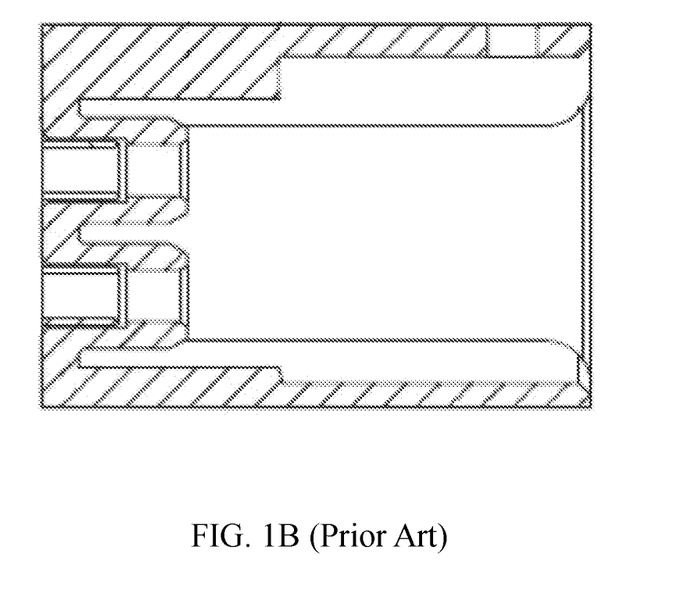

Because the optical connectors launched by manufacturers have some differences in specifications, manufacturers must design receptacles corresponding to their own optical connector specifications. For example, as shown in FIG. 1A and FIG. 1B, they are schematic cross-sectional views of two connectors with different specifications. FIG. 1A is a receptacle structure of a mini duplex connector (MDC) (hereinafter referred to as MDC connector), and FIG. 1B is a socket structure of an SN connector. These specifications can be found on the website of the QSFP-DD MSA (http://www.qsfp-dd.com/optical-connector/). Due to the different receptacle structures, if connectors having different specifications are used on the device end, the equipment manufacturer must also choose receptacle having different specifications, which increases the trouble of manufacturing procedures. In addition, if two connectors having different specifications are to be docked with each other, it is difficult to achieve both ends through a single receptacle. Therefore, it is necessary to use other types of adapters, which will also increase the cost problem. In addition, the receptacle structure of optical connectors of different specifications is not easy to recognize in appearance since the difference lies in the design of the internal coupling structure. Therefore, how to let users clearly know the current form of the connector is also a design problem.

To sum up, it's necessary to design a novel receptacle structure for the optical connector to solve conventional problems.

The above information disclosed in this section is only for enhancement of understanding of the background of the described technology and therefore it may contain information that does not form the prior art that is already known to a person of ordinary skill in the art.

SUMMARY OF THE INVENTION

The present invention provides a receptacle structure for an optical connector, which is designed by a replaceable adjusting plate disposed at an inserting side of the receptacle. The user is able to adjust the receptacle structure by the adjusting plate, and makes the same receptacle structure accommodate for different kinds of optical connectors.

The present invention provides a receptacle structure for an optical connector, which has a detachable coupling structure. The user is able to adjust the configuration way according different kinds of optical connectors to adapt to different kinds of optical connectors.

In one embodiment of the present invention, the present invention provides a receptacle structure for an optical connector, comprising: a base, having an insertion hole, a supporting frame disposed at a side of the insertion hole, and a supporting structure disposed at two side walls of the insertion hole; a first adjusting plate, detachably disposed on the supporting frame, the first adjusting plate having a first matching structure corresponding to a first connector and a second matching structure corresponding to a second connector; and a second adjusting plate, detachably disposed on the supporting structure, the second adjusting plate having a third matching structure corresponding to the first connector and a fourth matching structure corresponding to the second connector, wherein when the first matching structure is arranged at an opening side of the insertion hole and the third matching structure is arranged toward an inner space of the base, the first connector is inserted into the base via the insertion hole, and when the second matching structure is arranged at the opening side of the insertion hole and the fourth matching structure is arranged toward the inner space of the base, the second connector is inserted into the base via the insertion hole.

In another embodiment of the present invention, the present invention also provides a receptacle structure for an optical connector, comprising: a base, having a first insertion hole and a second insertion hole which are vertically arranged, a supporting frame disposed at a side of the first insertion hole, a first supporting structure disposed at two side walls of the first insertion hole, a second supporting structure disposed at a side of the second insertion hole, and a third supporting structure disposed at two side walls of the second insertion hole; a first adjusting plate and a second adjusting plate, the first adjusting plate detachably disposed on the supporting frame, the second adjusting plate detachably inserted into the second supporting structure, the first adjusting plate and the second adjusting plate respectively having a first matching structure corresponding to a first connector and a second matching structure corresponding to a second connector; and a pair of third adjusting plates, detachably disposed on the first supporting structure and the third supporting structure respectively, the each third adjusting plate having a third matching structure corresponding to the first connector and a fourth matching structure corresponding to the second connector, wherein when the first matching structure is arranged at an opening side of the first insertion hole and the third matching structure is arranged toward an inner space of the base, the first connector is inserted into the base via the first insertion hole, and when the second matching structure is arranged at the opening side of the first insertion hole and the fourth matching structure is arranged toward the inner space of the base, the second connector is inserted into the base via the first insertion hole; or wherein when the first matching structure is arranged at the opening side of the second insertion hole and the third matching structure is arranged toward the inner space of the base, the first connector is inserted into the base via the second insertion hole, and when the second matching structure is arranged at the opening side of the second insertion hole and the fourth matching structure is arranged toward the inner space of the base, the second connector is inserted into the base via the second insertion hole.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate a receptacle structure of an optical connector and an optical communication device using the same and to aid it of skilled in the art in practicing this invention. These embodiments are merely exemplary embodiments and in no way to be considered to limit the scope of the invention in any manner.

Figure 2A:
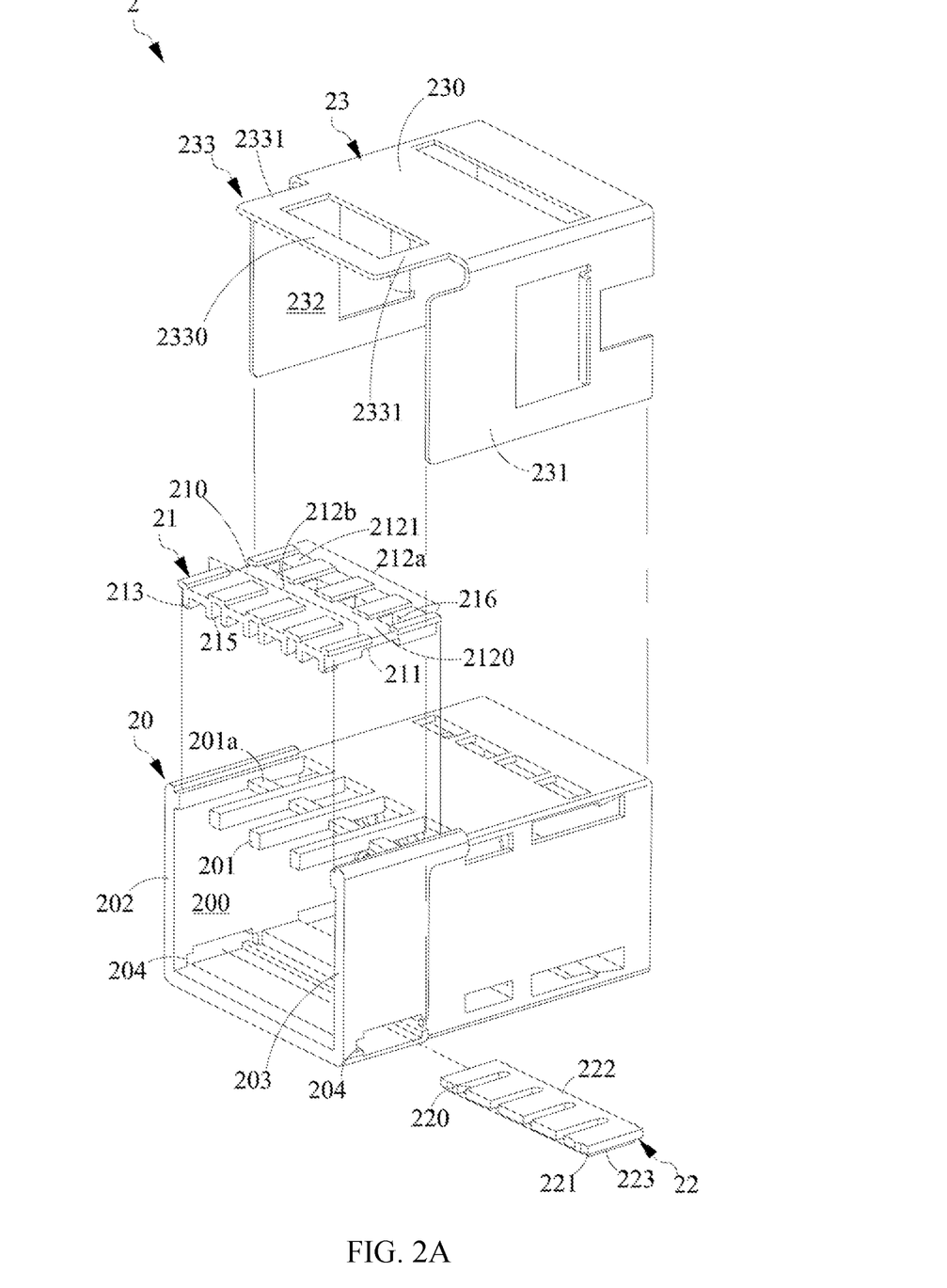
FIGS. 2A and 2B are respectively an exploded schematic diagram and a combined schematic diagram of an embodiment of a receptacle structure for an optical connector in the present invention.
Figure 2B:
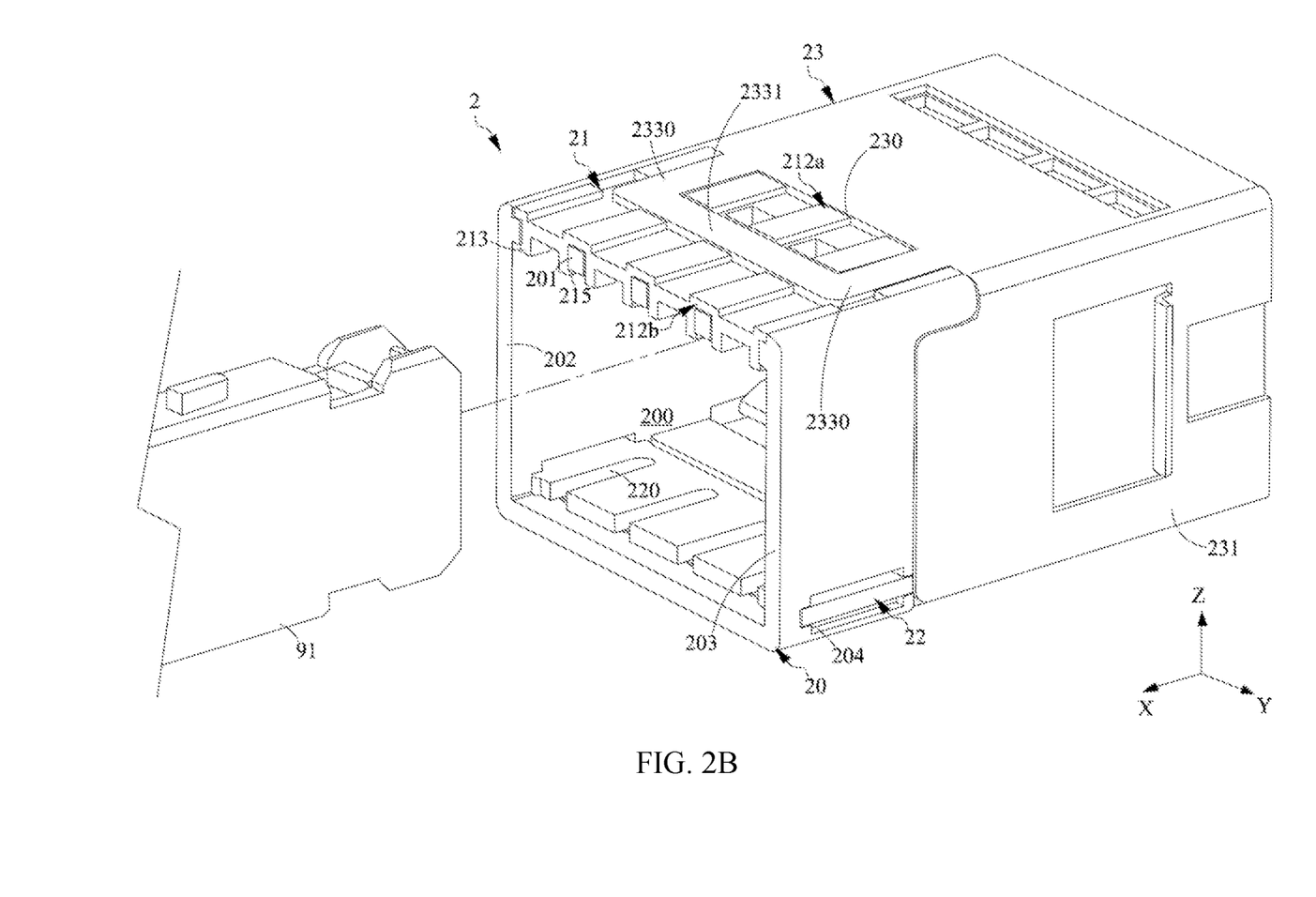

Please refer to FIGS. 2A and 2B, which are respectively an exploded schematic diagram and a combined schematic diagram of an embodiment of a receptacle structure for an optical connector in the present invention. In this embodiment, the receptacle structure 2 of the optical connector includes a base 20, a first adjusting plate 21 and a second adjusting plate 22. The base 20 has an insertion hole 200, a support frame 201 disposed above the insertion hole 200, and support structures 204 are disposed on the two side walls 202 and 203 of the insertion hole 200. In this embodiment, the support frame 201 is a plurality of brackets extending from the base 20 toward an opening of the insertion hole 200. In an embodiment, the supporting member 201a may be disposed perpendicular to the bracket according to the length of the protruding bracket. In this embodiment, the supporting structure 204 is an open structure. It should be noted that there is also an insertion hole on the other side of the base, which can also be inserted into a connector or connected with a signal line, such as an optical fiber. For the convenience of description, the following embodiment uses the side of insertion hole 200 as an example.

The first adjusting plate 21 is detachably disposed on the supporting frame 201. The first adjusting plate 21 has a first surface 210 and a second surface 211 corresponding to each other. In this embodiment, the first adjusting plate 21 corresponding to the second surface 211 of the support frame 201 has a plurality of abutment grooves 215 for matching with the protrusion of the supporting frame 201. In this embodiment, the supporting frame 201 is embedded in the abutment groove 215 so that the first adjusting plate 21 can be supported by the supporting frame 201. In addition, the first surface 210 of the first adjusting plate 21 has first engaging structures 212a and 212b. In this embodiment, the first engaging structures 212a and 212b are respectively disposed on the front side and back side of the first surface 210.

Figure 3A:
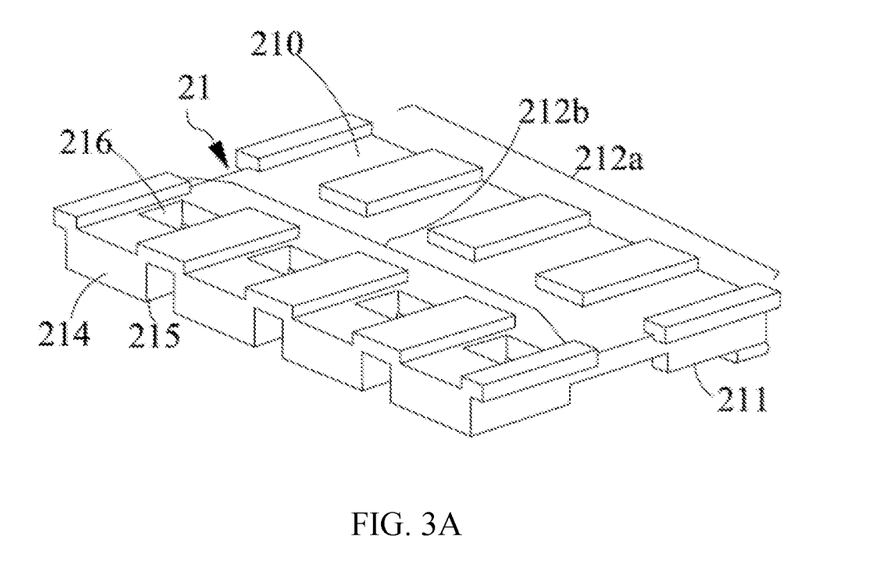
FIG. 3A is a schematic diagram of the first adjusting plate from different perspectives.

As shown in FIGS. 2A and 3A, the first adjusting plate 21 has a first matching structure 213 corresponding to the first connector and a second matching structure 214 corresponding to the second connector. In this embodiment, the first connector is an SN connector. The second connector is an MDC connector. In this embodiment, the first matching structure 213 and the second matching structure 214 are respectively disposed on the front side and back side of the second surface 211. The first matching structure 213, in this embodiment, is a groove structure, and the second matching structure 214 is a solid block structure. There are a plurality of through holes 216 on the first surface 213 close to the second matching structure 214. It should be noted that the installation positions of the first matching structure 213 and second matching structure 214 can be determined according to requirements, and are not limited to this embodiment. For example, in another embodiment, the first matching structure 213 and the second matching structure 214 can be disposed on the corresponding sides of the first surface 210 and the second surface 211 by appropriate designs.

Figure 3B:
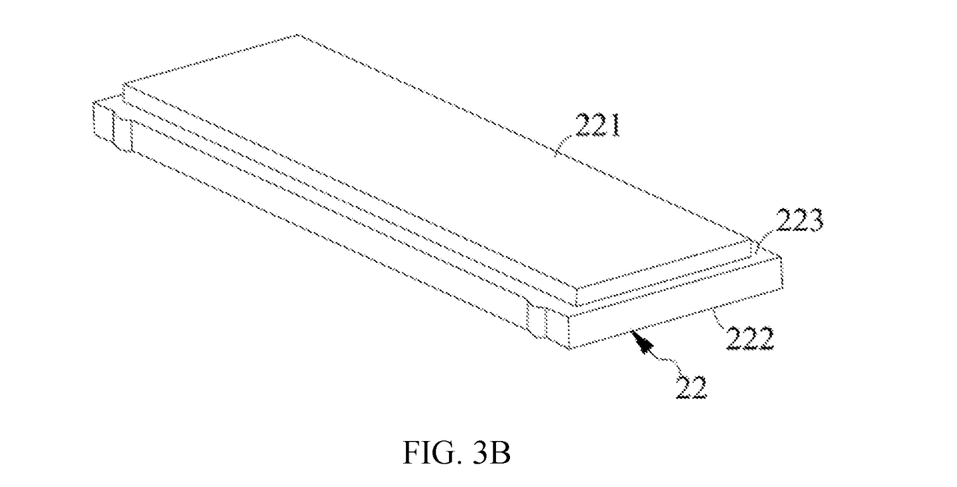
FIG. 3B is a schematic diagram of the second adjusting plate from different perspectives.

As shown in FIGS. 2A and 2B, the second adjusting plate 22 is detachably disposed in the supporting structure 204 on both sides of the insertion hole 200, and both ends of the second adjusting plate 22 abut the wall surface of the supporting structure 204. In this embodiment, as shown in FIGS. 2A and 3B, the second adjusting plate 22 has a third matching structure 220 corresponding to the first connector and a fourth matching structure 221 corresponding to the second connector. In this embodiment, the third matching structure 220 is disposed on the third surface 222, and the fourth matching structure 221 is disposed on the fourth surface 223. In this embodiment, the third matching structure 220 has a plurality of slot structures, which correspond to each first connector. The fourth matching structure 221 is a protruding flat structure, protruding from the fourth surface 223. It should be noted that the installation positions of the third matching structure 220 and the fourth matching structure 221 may be determined according to requirements, and are not limited to this embodiment. For example, in another embodiment, the third matching structure 220 and the fourth matching structure 221 can be disposed on both sides of the same surface.

Figure 4A:
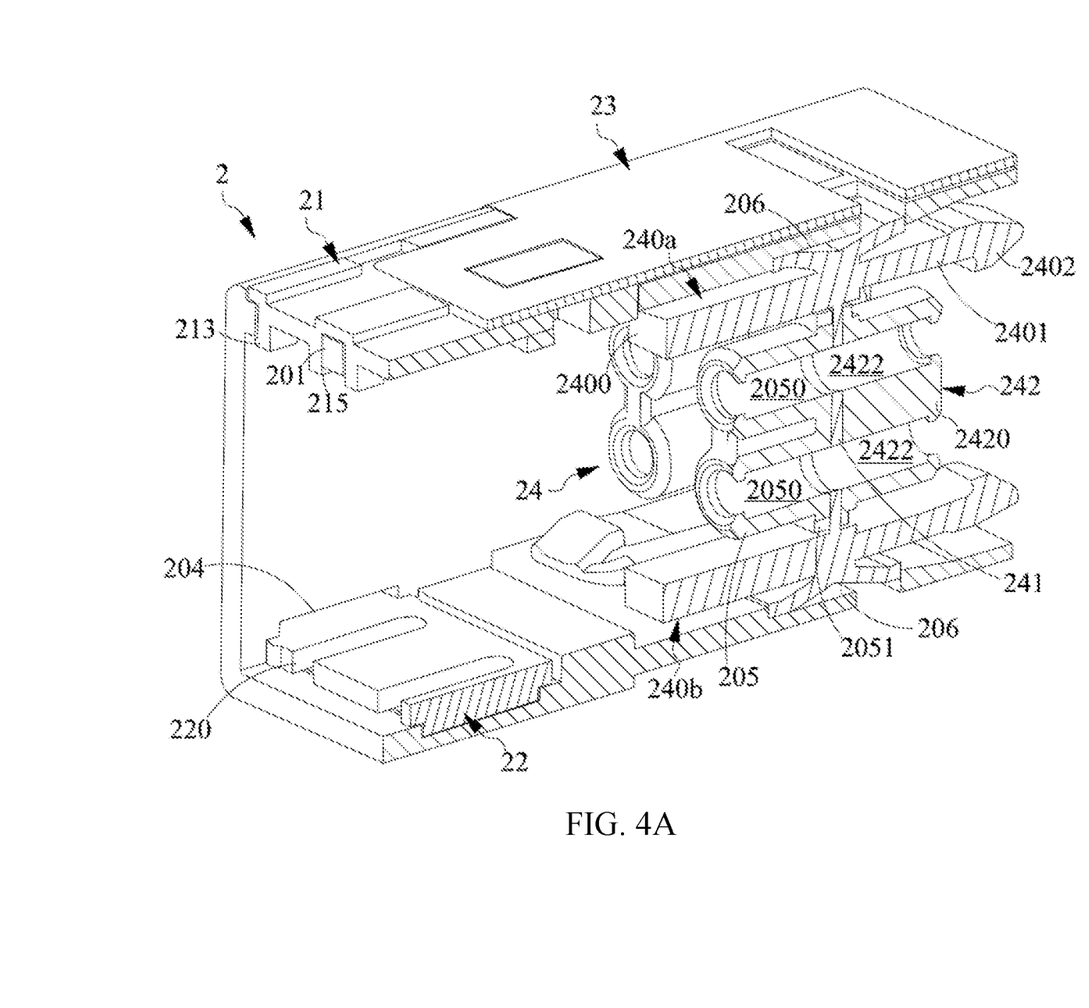
FIGS. 4A and 4B are respectively a sectional schematic diagram of a base, and a three-dimensional schematic diagram of an embodiment of a coupling structure inside the base in the present invention.
Figure 4B:
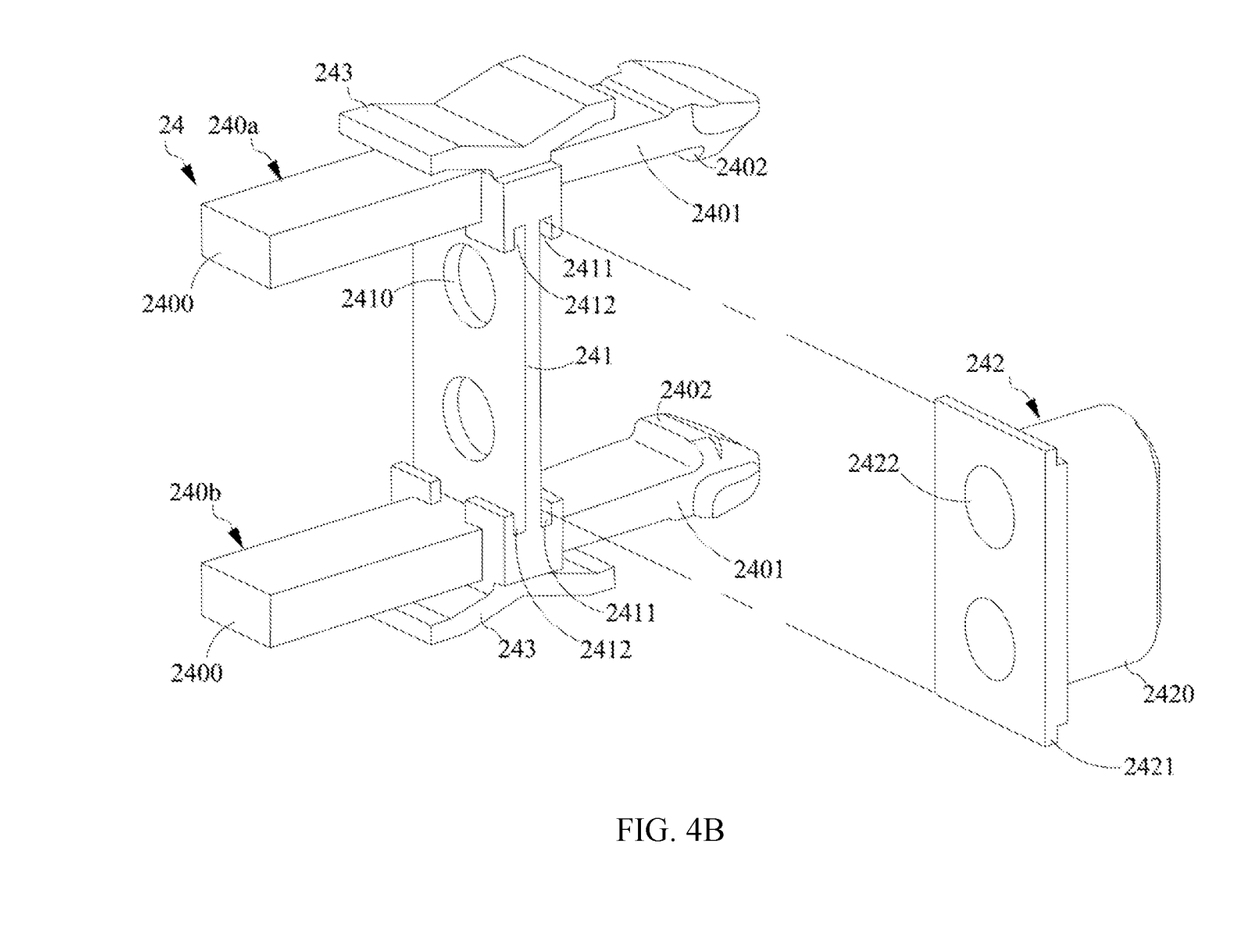

Please refer to FIGS. 4A and 4B, which are respectively a sectional schematic diagram of a base, and a three-dimensional schematic diagram of an embodiment of a coupling structure inside the base in the present invention. The base 20 further has at least one coupling structure 24. The number of the coupling structure 24 depends on the number of connectors. For example, in this embodiment, four connectors can be inserted into coupling structures, so there are four coupling structures. In this embodiment, the coupling structure 24 further includes a pair of buckle structures 240a and 240b, a supporting element 241, and a first coupling portion 242. The buckle structures 240a and 240b are respectively disposed in parallel on both sides of the first coupling portion 242. In this embodiment, each buckle structure 240a and 240b has a first extending element 2400 and a second extending element 2401 on both sides of the first coupling portion 242, respectively. In this embodiment, the first extending element 2400 is a rectangular column, the body of the second extending element 2401 is a rectangular column, and a hook 2402 is disposed at the end of the second extending element 2401. The first extending element 2400 can be applied to, such as MDC connectors, while the second extending element 2401 can be applied to MDC or SN connectors. Therefore, the choice of the extending element 2400 or 2401 can be determined according to the requirements, and is not limited thereto.

The supporting element 241 is disposed between the pair of buckle structures 240a and 240b, and both ends of supporting element 241 are connected to the pair of buckle structures 240a and 240b. The body of the supporting element 241 has two through holes 2410, and two sides of the supporting element 241 respectively has a slot 2411 and 2412. The first coupling portion 242 has a coupling body 2420, a plate-shaped structure 2421 is on one side, and two ends of which are respectively embedded into the slot 2411. The coupling body 2420 has a pair of through holes 2422 penetrating the plate-shaped structure 2421. Therefore, when the first coupling portion 242 is installed in the slot 2411, the through hole 2422 of the first coupling portion 242 corresponds to the through hole 2410 of the supporting element 241.

There are a plurality of second coupling portions 205 inside the base 20, and the second coupling portions 205 are integrally formed with and connected to the base 20. The base 20 has an engaging groove 206 corresponding to the installation position of the coupling structure 24, and each coupling structure 24 has an engaging structure 243 at a position corresponding to the engaging groove 206. Each coupling structure 24 is connected to the engaging groove 206 by the engaging structure 243 so that the coupling structure 24 is fixed in the base 20. In this embodiment, the engaging structure 243 is a V-shaped structure, which is used to provide flexibility when embedded into the engaging groove 206, so as to provide a force for fixing the coupling structure 24 in the base 20. When the coupling structure 24 is disposed in the base 20, the outer frame 2051 of the second coupling portion 205 in the base 20 is embedded into the slot 2412. The signal through hole 2050 in the second coupling portion 205 corresponds to the through hole 2410 of the supporting element 241. Therefore, when the insertion hole 200a of the receptacle structure 2 and the insertion hole 200b on the other side are inserted by connectors, the connectors on both sides can be electrically connected by the first coupling portion 242 and the second coupling portion 205.

Please refer to FIGS. 2A and 2B, the receptacle structure 2 further has a cover structure 23, which is combined with the base 20. In this embodiment, the cover structure 23 has a top plate 230, and two side plates 231 are respectively disposed on both sides of the top plate 230, so that the cover structure 23 has a space 232. A second engaging structure 233, which is disposed at the front end of the top plate 230, has a first engaging member 2330 and second engaging members 2331 connected to both sides of the first engaging member 2330. When the cover structure 23 is combined with the base 20, the first engaging member 2330 is inserted into the slot 2120 between the first engaging structures 212a and 212b, and the second engaging members 2331 are inserted into the slot 2121 included in the first engaging structures 212a, so that the cover structure 23 can be fixed on the outer surface of the base 20, and the first adjusting plate 21 is fixed on the base 20.

Next, the spirit of the present invention is described. Please refer to FIGS. 2B and 2C and FIGS. 3A and 3B. The spirit of the present invention is that the same connector can be inserted into the insertion hole by changing the orientation of the first adjusting plate 21 and the second adjusting plate 22, for example, the insertion hole 200a can be adapted to different connectors. Taking the example of FIG. 2B, the SN connector 91 can be applied to the insertion hole 200 in the orientation of the first adjusting plate 21 and the second adjustment plate 22. That is, when the first matching structure 213 is disposed at the opening side of the insertion hole 200 and the third matching structure 220 on the third surface 222 is arranged toward the interior space of the insertion hole 200, the SN connector 91 can be applied.

Figure 2C:
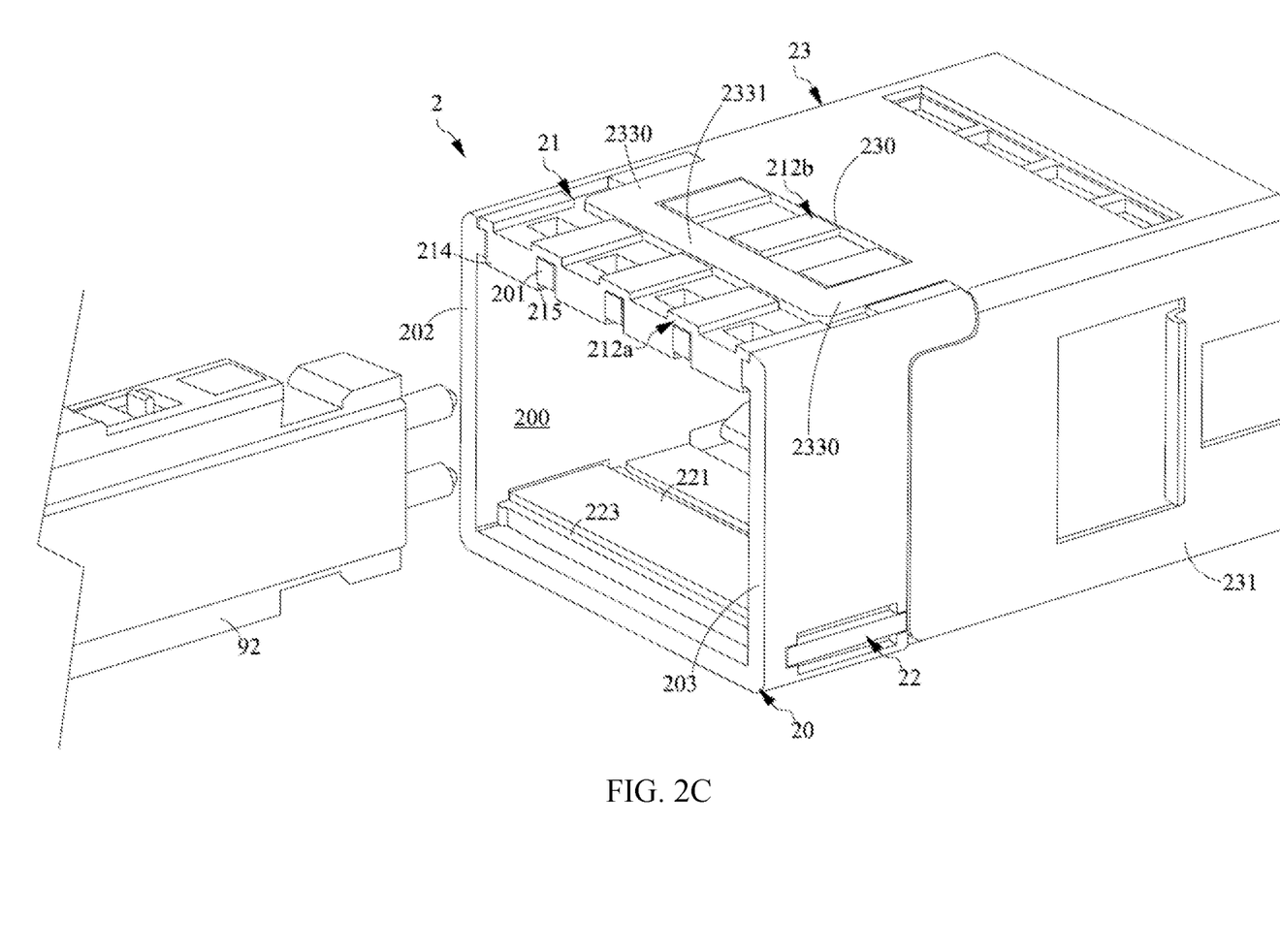
FIG. 2C is a schematic diagram of an embodiment of the receptacle structure adapted to another optical connector in the present invention.

When the user needs to change the type of the connector, for example, to replace with an MDC connector, the user may remove the cover structure 23, and then take out the first adjusting plate 21 to make the first adjusting plate 21 rotate along the Z axis in a predetermined angle, such as 180 degrees in this embodiment, so that the second matching structure 214 is located on the side of the insertion hole 200, and then put back on the supporting frame 201. After the second adjusting plate 22 is taken out of the supporting structure 204, the second adjusting plate 22 is rotated along the X axis or the Y axis in the predetermined angle, such as 180 degrees in this embodiment, and then inserted into the supporting structure 204 so that the fourth matching structure 221 is arranged toward the insertion hole 200, and the state is shown in FIG. 2C. In this configuration, the insertion hole 200 may be adapted to be inserted by the MDC connector 92. It should be noted that, taking the coupling structure of FIG. 4B as an example, the coupling structure 24 may be selected by the assembly design, the first extending element 2400 or the second extending element 2401 having the hook 2402 is selected to face the side of the insertion hole 200 to accommodate for different kinds of connectors. For example, when the hook 2402 is arranged toward the insertion hole 200, the MDC connector or the SN connector may be used at the same time, and when the first extending element 2400 without the hook 2402 is arranged toward the insertion hole 200, the MDC connector may be used.

Figure 5A:
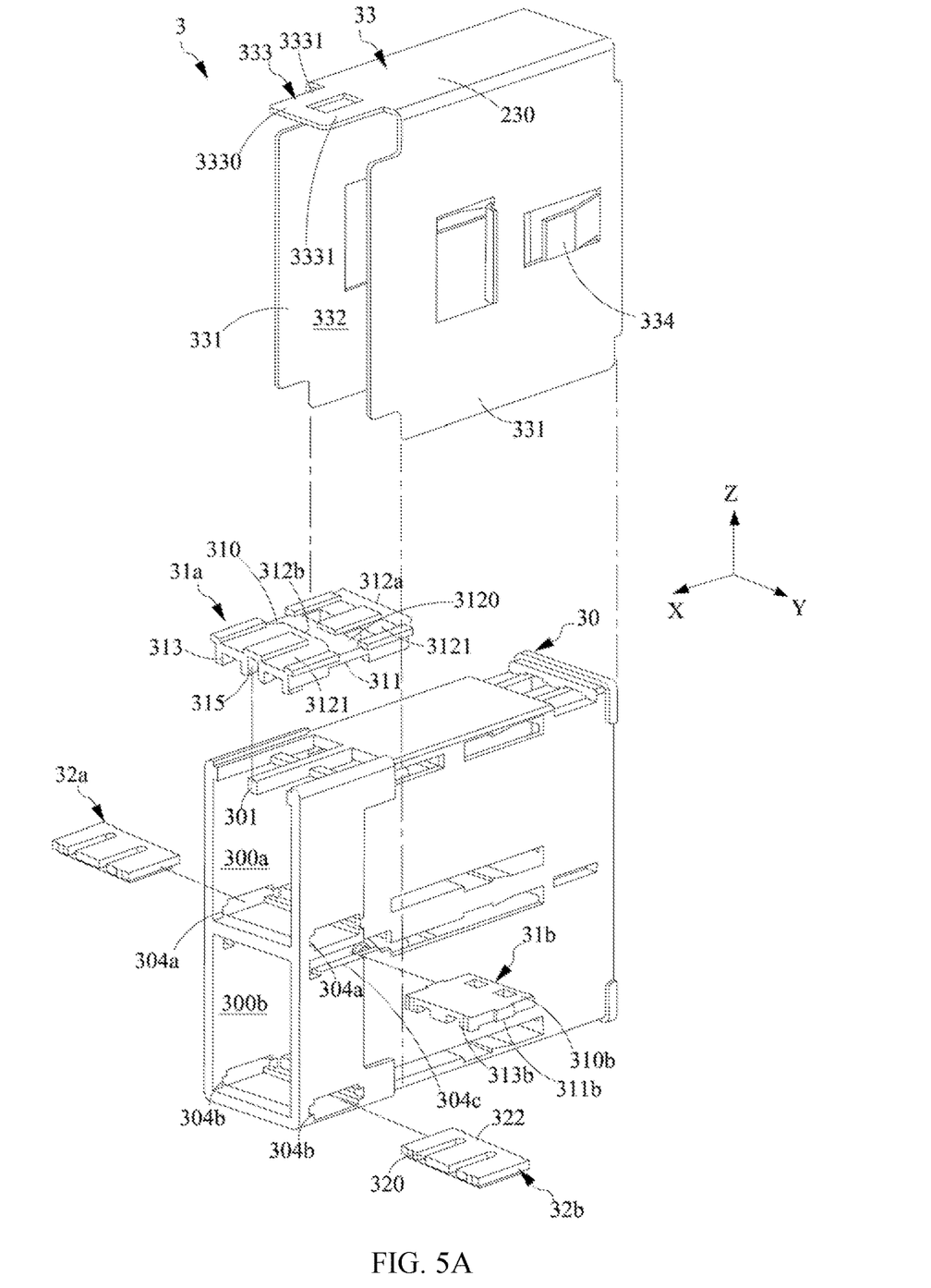
FIGS. 5A and 5B are respectively an exploded schematic diagram and a combined schematic diagram of another embodiment of the receptacle structure for the optical connector in the present invention.
Figure 5B:
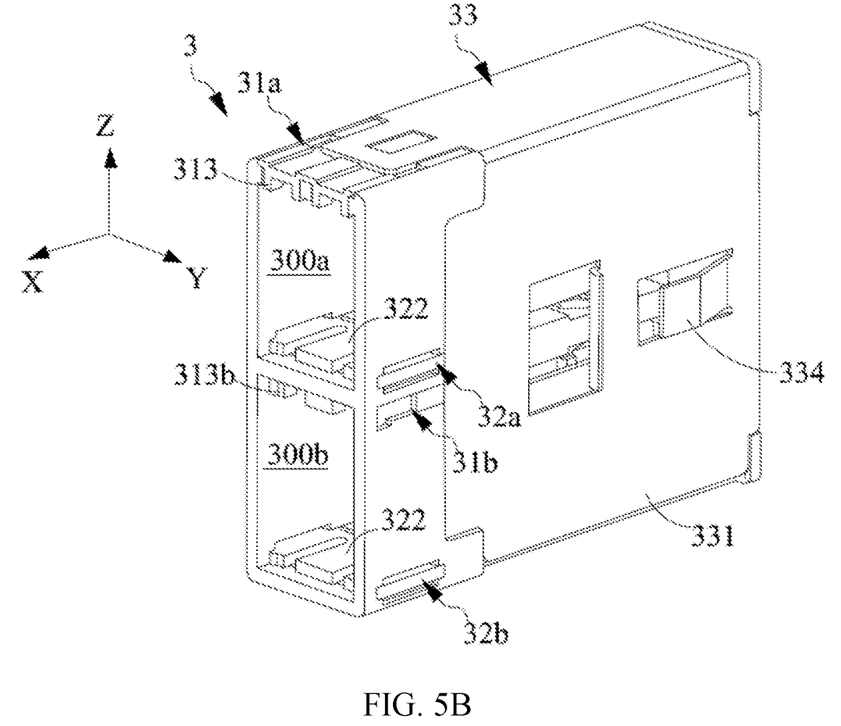
Figure 6A:
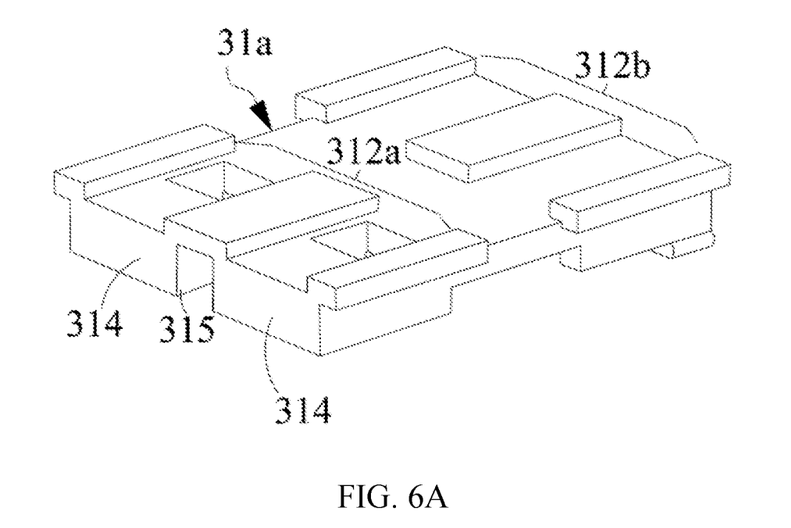
FIGS. 6A to 6C are schematic diagrams of the first to third adjusting plates of the second embodiment of the receptacle structure from different perspectives in the present invention.
Figure 6B:
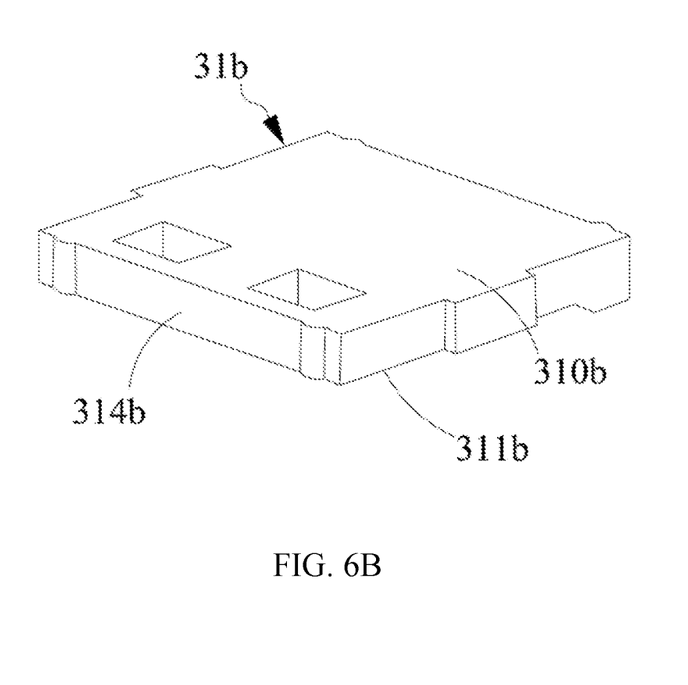
Figure 6C:
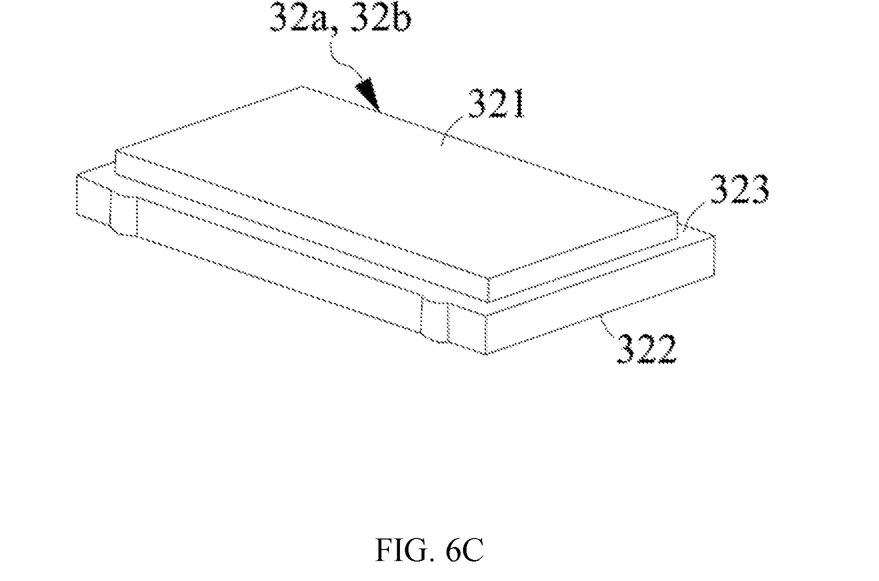

Please refer to FIGS. 5A and 5B and FIGS. 6A to 6C, FIGS. 5A and 5B are respectively an exploded schematic diagram and a combined schematic diagram of another embodiment of the receptacle structure for the optical connector in the present invention, and FIGS. 6A to 6C are schematic diagrams of the first to third adjusting plates of the second embodiment of the receptacle structure from different perspectives in the present invention. The receptacle structure 3 in this embodiment is mainly a structure designed for vertically stacked connectors. The receptacle structure 3 includes a base 30, a first adjusting plate 31a, a second adjusting plate 32a, and a pair of third adjusting plates 31b and 32b. The base 30 has a first insertion hole 300a and a second insertion hole 300b that are vertically arranged, and each insertion hole 300a or 300b can be inserted into two connectors. It should be noted that, although the insertion holes 300a and 300b in this embodiment are insertion holes that can be inserted by two connectors, the number of inserted connectors can be determined according to requirements, and is not limited to this embodiment. In addition, on the other side of the insertion holes 300a and 300b, the base 20 also has corresponding insertion holes that can be inserted by signal lines or connectors.

A supporting frame 301 is disposed on the upper side of the first insertion hole 300a, and its structure is identical to aforementioned supporting frame 201. The first supporting structure 304a is disposed under the two side walls of the first insertion hole 300a and above the second insertion hole 300b respectively. The second supporting structure 304c is disposed on the upper side of the second insertion hole 300b and under the first supporting structure 304a, and the third supporting structures 304b is disposed under the two side walls of the second insertion hole 300b. The structure of the first supporting structure 304a and the third support structure 304c in this embodiment is the same as that of the aforementioned supporting structure 204, which would not be repeated herein.

The first adjusting plate 31a is detachably disposed on the supporting frame 301, and the first engaging structures 312a and 312b are disposed on the first surface 310 of the first adjusting plate 31a. The second surface 311 of the first adjusting plate 31a has a first matching structure 313 corresponding to the first connector and a second matching structure 314 corresponding to the second connector. In this embodiment, the first matching structure 313 is a groove structure, which is disposed on the first side of the second surface 311, and the second matching structure 314 is a solid block structure, which is disposed on the second side of the second surface 311. The first adjusting plate 31a further has an abutment groove 315 corresponding to the supporting frame 301. When the first adjusting plate 31a is combined with the supporting frame 301, the supporting frame 301 is accommodated in the abutment groove 315. The second adjusting plate 32a is detachably disposed in the second supporting structure 304c on both sides of the insertion hole 300b, and both ends of the second adjusting plate 32a abut the wall surface of the second support structure 304c. In this embodiment, the second adjusting plate 31b has a third matching structure 313b corresponding to the SN connector and a fourth matching structure 314b corresponding to the MDC connector. In this embodiment, the first matching structure 313b is a groove structure, which is disposed on the first side of the second surface 311b, and the second matching structure 314b is a solid block structure, which is disposed on the second side of the second surface 311b. It should be noted that the positions of the first matching structures 313, 313b and second matching structures 314, 314b can be determined according to requirements, and they are the same as the first matching structure 213 and second matching structure 214 respectively described above, which would not be repeated herein.

The third adjusting plates 32a and 32b are detachably disposed in the first supporting structure 304a and the third supporting structure 304b, respectively. Each third adjusting plate 32a and 32b has a third matching structure 320 corresponding to the SN connector and a fourth matching structure 321 corresponding MDC connector. In this embodiment, the third matching structure 320 is disposed on the third surface 322, and the fourth matching structure 321 is disposed on the fourth surface 323. In this embodiment, the third matching structure 320 has a plurality of slot structures, which corresponds to each SN connector respectively. The fourth matching structure 321 is a protruding flat structure, protruding from the fourth surface 323. It should be noted that the positions of the third matching structure 320 and fourth matching structure 321 can be determined according to requirements, and they are the same as the third matching structure 220 and fourth matching structure 221 as described above, which would not be repeated herein.

The receptacle structure 3 further has a cover structure 33 combined with the base 30. In this embodiment, the cover structure 33 has a top plate 330 and two side plates 331 disposed on both sides of the top plate 330 respectively, so that the cover structure 33 has a space 332. The front end of the top plate 330 has a second engaging structure 333, which consists of a first engaging member 3330 and second engaging members 3331 connected to both sides of the first engaging member 3330. When the cover structure 33 is combined with the base 30, the first engaging member 3330 is inserted into the slot 3120 between the first engaging structures 312a and 312b, and the second engaging member 3331 is inserted into the slot 3121 included in the first engaging structure 312a, so that the cover structure 33 can be fixed on the outer surface of the base 30, and the first adjusting plate 31a is fixed on the base 30. Both sides of the cover structure 33 respectively have a diagonal elastic extending element 334, which is used in binding purposes when the device is combined with a cabinet of the device to fix the receptacle structure 3 on the cabinet of the device. It should be noted that the base 20 also has a coupling structure corresponding to the first insertion hole 300a and the second insertion hole 300b, this coupling structure is the same as the aforementioned coupling structure, which would not repeated herein.

Next, in this embodiment, how to correspond to the SN connector and the MDC connector would be explained. As shown in FIG. 5B, when the SN connector is inserted into the base 30 via the first insertion hole 300a or the second insertion hole 300b, the first matching structure 313 is adjusted to be located on the opening side of the first insertion hole 300a, and the first matching structure 313b is adjusted to the position on the opening side of the second insertion port 300b. The third matching structure 322 is arranged toward the inner space of the first insertion hole 300a, and the third matching structure 322b is arranged toward the inner space of the second insertion hole 300b.

When the user needs to insert the MDC connector into the base 30 through the first insertion hole 300a or the second insertion hole 300b, the first adjusting plate 31a and the second adjusting plate 31b are taken out to make the first adjusting plate 31a and the second adjusting plate 31b rotated by a predetermined angle along the Z axis, so that the second matching structure 314 is located on the opening side of the first insertion hole 300a, and the first adjusting plate 31a is disposed on the supporting frame 301. Similarly, both ends of the second adjusting plate 31b are inserted into the second supporting structure 304b. Also, the second adjusting plates 32a and 32b are taken out from the first supporting structure 304a and third supporting structure 304b respectively, the second adjusting plates 32a and 32b are rotated by a predetermined angle along the X axis or the Y axis respectively, and the second adjusting plates 32a and 32b are inserted into the first support structure 304a and third support structure 304b respectively, so that the fourth matching structure 321 is arranged toward the inner space of the first insertion hole 300a and the second insertion hole 300b. For this configuration, the MDC connector can be inserted into the receptacle structure 3 through the first insertion hole 300a or the second insertion hole 300b. It should be noted that although the foregoing embodiment takes the first insertion hole 300a and the second insertion hole 300b inserted by the same connector as an example, the first insertion hole 300a and the second insertion hole 300b may be inserted by different connectors in actual application. For example, the first insertion hole 300a is inserted by the SN connector, and the second insertion hole 300b is inserted by the MDC connector, and vice versa.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. A receptacle structure for an optical connector, comprising:
    a base, having an insertion hole, a supporting frame disposed at a side of the insertion hole, and a supporting structure disposed at two side walls of the insertion hole;
    a first adjusting plate, detachably disposed on the supporting frame, the first adjusting plate having a first matching structure corresponding to a first connector and a second matching structure corresponding to a second connector; and
    a second adjusting plate, detachably disposed on the supporting structure, the second adjusting plate having a third matching structure corresponding to the first connector and a fourth matching structure corresponding to the second connector,
    wherein when the first matching structure is arranged at an opening side of the insertion hole and the third matching structure is arranged toward an inner space of the base, the first connector is inserted into the base via the insertion hole, and when the second matching structure is arranged at the opening side of the insertion hole and the fourth matching structure is arranged toward the inner space of the base, the second connector is inserted into the base via the insertion hole.

2. The receptacle structure of claim 1, wherein a first side on a second surface of the first adjusting plate has the first matching structure, which is a groove structure, and the third matching structure is a slot structure corresponding to the groove structure.

3. The receptacle structure of claim 1, wherein a second side on a second surface of the first adjusting plate has the second matching structure, which is a solid block structure, and the fourth matching structure is a protruding flat structure.

4. The receptacle structure of claim 1, wherein the base comprises at least one coupling structure used for coupling to the first connector or the second connector, the at least one coupling structure comprises:
    a pair of buckle structures, arranged parallel to each other, and the each buckle structure having an extending element extending to both ends, at least one end of the buckle structure has a hook;
    a supporting element, disposed between and connected to the pair of buckle structures, and two sides of the supporting element respectively has a slot; and
    a coupling portion, embedded into the slot.

5. The receptacle structure of claim 4, wherein an engaging groove corresponds to the pair of buckle structures inside the base, the pair of buckle structures has an engaging structure corresponding to the engaging groove, and the each coupling structure is connected to the engaging groove via the engaging structure to make the coupling structure fix in the base.

6. The receptacle structure of claim 1, wherein the first connector is an SN connector, and the second connector is a MDC connector.

7. The receptacle structure of claim 1, further comprising a cover structure combined with the base, wherein a first surface of the first adjusting plate has a first engaging structure, and the cover structure corresponded to the first engaging structure has a second engaging structure, which is engaged with the first engaging structure.

8. A receptacle structure for an optical connector, comprising:
    a base, having a first insertion hole and a second insertion hole which are vertically arranged, a supporting frame disposed at a side of the first insertion hole, a first supporting structure disposed at two side walls of the first insertion hole, a second supporting structure disposed at a side of the second insertion hole, and a third supporting structure disposed at two side walls of the second insertion hole;

a first adjusting plate and a second adjusting plate, the first adjusting plate detachably disposed on the supporting frame, the second adjusting plate detachably inserted into the second supporting structure, the first adjusting plate and the second adjusting plate respectively having a first matching structure corresponding to a first connector and a second matching structure corresponding to a second connector; and a pair of third adjusting plates, detachably disposed on the first supporting structure and the third supporting structure respectively, the each third adjusting plate having a third matching structure corresponding to the first connector and a fourth matching structure corresponding to the second connector, wherein when the first matching structure is arranged at an opening side of the first insertion hole and the third matching structure is arranged toward an inner space of the base, the first connector is inserted into the base via the first insertion hole, and when the second matching structure is arranged at the opening side of the first insertion hole and the fourth matching structure is arranged toward the inner space of the base, the second connector is inserted into the base via the first insertion hole; or wherein when the first matching structure is arranged at the opening side of the second insertion hole and the third matching structure is arranged toward the inner space of the base, the first connector is inserted into the base via the second insertion hole, and when the second matching structure is arranged at the opening side of the second insertion hole and the fourth matching structure is arranged toward the inner space of the base, the second connector is inserted into the base via the second insertion hole.

9. The receptacle structure of claim 8, wherein a first side on a second surface of the first adjusting plate and the second adjusting plate respectively has the first matching structure, which is a groove structure, and the third matching structure is a slot structure corresponding to the groove structure.

10. The receptacle structure of claim 8, wherein a second side on a second surface of the first adjusting plate and the second adjusting plate respectively has the second matching structure, which is a solid block structure, and the fourth matching structure is a protruding flat structure.

11. The receptacle structure of claim 8, wherein the base comprises at least one coupling structure used for couple to the first connector or the second connector, the at least one coupling structure comprises:

a pair of buckle structures, arranged parallel to each other, and the each buckle structure having an extending element extending to both ends, at least one end of the buckle structure has a hook;

a supporting element, disposed between and connected to the pair of buckle structures, and two sides of the supporting element respectively has a slot; and a coupling portion, embedded into the slot.

12. The receptacle structure of claim 11, wherein an engaging groove corresponds to the pair of buckle structures inside the base, the pair of buckle structures has an engaging structure corresponding to the engaging groove, and the each coupling structure is connected to the engaging groove via the engaging structure to make the coupling structure fix in the base.

13. The receptacle structure of claim 8, wherein the first connector is an SN connector, and the second connector is a MDC connector.

14. The receptacle structure of claim 8, further comprising a cover structure combined with the base, wherein a first surface of the first adjusting plate has a first engaging structure, and the cover structure corresponded to the first engaging structure has a second engaging structure, which is engaged with the first engaging structure, and two sides of the cover structure respectively have a diagonal elastic extending element.

* * * * *